United States Patent

Chiong

(10) Patent No.: US 9,815,942 B2
(45) Date of Patent: Nov. 14, 2017

(54) TECHNIQUE FOR FORMING A HIGH MELT VISCOSITY POLYARYLENE SULFIDE

(71) Applicant: Ticona LLC, Florence, KY (US)

(72) Inventor: Hendrich A. Chiong, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 15/045,321

(22) Filed: Feb. 17, 2016

(65) Prior Publication Data

US 2016/0280859 A1    Sep. 29, 2016

Related U.S. Application Data

(60) Provisional application No. 62/137,860, filed on Mar. 25, 2015, provisional application No. 62/197,655, filed on Jul. 28, 2015, provisional application No. 62/206,155, filed on Aug. 17, 2015.

(51) Int. Cl.
*C08G 75/00* (2006.01)
*C08G 75/14* (2006.01)

(52) U.S. Cl.
CPC .................... *C08G 75/14* (2013.01)

(58) Field of Classification Search
CPC .. C08G 75/025; C08G 75/14; C08G 75/0263; C08G 75/0268; C08G 75/0259; C08G 75/0281; B29B 13/00; C08F 6/008; C08F 6/28; B30B 9/28
See application file for complete search history.

(56) References Cited

U.S. PATENT DOCUMENTS

| | | |
|---|---|---|
| 3,407,182 A | 10/1968 | Hinton |
| 3,869,433 A | 3/1975 | Campbell |
| 3,919,177 A | 11/1975 | Campbell |
| 4,038,259 A | 7/1977 | Campbell et al. |
| 4,038,260 A | 7/1977 | Campbell |
| 4,038,262 A | 7/1977 | Edmonds, Jr. |
| 4,038,263 A | 7/1977 | Edmonds, Jr. et al. |
| 4,039,518 A | 8/1977 | Campbell |
| 4,056,515 A | 11/1977 | Vidaurri, Jr. |
| 4,060,520 A | 11/1977 | Irvin |
| 4,064,114 A | 12/1977 | Edmonds, Jr. |
| 4,089,847 A | 5/1978 | Edmonds, Jr. et al. |
| 4,096,132 A | 6/1978 | Edmonds, Jr. |

(Continued)

FOREIGN PATENT DOCUMENTS

| | | |
|---|---|---|
| EP | 1 837 359 | 9/2007 |
| JP | S5829822 | 2/1983 |

(Continued)

OTHER PUBLICATIONS

Machine translation of JP2014028917.

(Continued)

*Primary Examiner* — Shane Fang
(74) *Attorney, Agent, or Firm* — Dority & Manning, P.A.

(57) ABSTRACT

A method for forming a high melt viscosity polyarylene sulfide is provided. The method comprises reacting a sulfur source with a dihaloaromatic compound during a first stage to form an arylene sulfide prepolymer having halogen end groups; and thereafter, reacting the arylene sulfide prepolymer with a secondary sulfur source during a second stage to form the polyarylene sulfide.

20 Claims, 2 Drawing Sheets

(56) References Cited

U.S. PATENT DOCUMENTS

| | | |
|---|---|---|
| 4,368,321 A | 1/1983 | Sherk et al. |
| 4,370,470 A | 1/1983 | Vidaurri et al. |
| 4,393,197 A | 7/1983 | Edmonds, Jr. |
| 4,415,729 A | 11/1983 | Scoggins et al. |
| 4,451,640 A | 5/1984 | Shiiki et al. |
| 4,495,332 A | 1/1985 | Shiiki et al. |
| 4,500,706 A | 2/1985 | Mathis et al. |
| 4,501,902 A | 2/1985 | Cleary |
| 4,514,558 A | 4/1985 | Shiiki et al. |
| 4,535,117 A | 8/1985 | Mathis et al. |
| 4,537,953 A | 8/1985 | Kawakami et al. |
| 4,613,654 A | 9/1986 | Katto et al. |
| 4,645,826 A | 2/1987 | Iizuka et al. |
| 4,699,975 A | 10/1987 | Katto et al. |
| 4,734,484 A | 3/1988 | Alfes et al. |
| 4,740,569 A | 4/1988 | Tieszen et al. |
| 4,745,167 A | 5/1988 | Iizuka et al. |
| 4,748,231 A | 5/1988 | Nesheiwat |
| 4,767,841 A | 8/1988 | Goetz et al. |
| 4,769,442 A | 9/1988 | Iwasaki et al. |
| 4,786,711 A | 11/1988 | Senatore et al. |
| 4,794,164 A | 12/1988 | Iwasaki et al. |
| 4,795,671 A | 1/1989 | Shiiki et al. |
| 4,812,539 A | 3/1989 | Iizuka et al. |
| 4,814,430 A | 3/1989 | Iwasaki et al. |
| 4,820,800 A | 4/1989 | Geibel et al. |
| 4,820,801 A | 4/1989 | Inoue et al. |
| 4,841,019 A | 6/1989 | Iwasaki et al. |
| 4,931,516 A | 6/1990 | Iizuka et al. |
| 4,960,861 A | 10/1990 | Kotera et al. |
| 4,976,825 A | 12/1990 | Iwasaki et al. |
| 5,008,368 A | 4/1991 | Nesheiwat |
| 5,015,725 A | 5/1991 | Scoggins et al. |
| 5,023,315 A | 6/1991 | Ceurvorst et al. |
| 5,037,954 A | 8/1991 | Nesheiwat et al. |
| 5,053,486 A | 10/1991 | Nesheiwat |
| 5,071,944 A | 12/1991 | Cliffton et al. |
| 5,077,374 A | 12/1991 | Cleary |
| 5,086,163 A | 2/1992 | Scoggins et al. |
| 5,089,596 A | 2/1992 | Clifton et al. |
| 5,089,597 A | 2/1992 | Nesheiwat et al. |
| 5,093,468 A | 3/1992 | Kohler |
| 5,110,902 A | 5/1992 | Scoggins et al. |
| 5,126,430 A | 6/1992 | Senga et al. |
| 5,128,445 A | 7/1992 | Scoggins et al. |
| 5,134,224 A | 7/1992 | Nesheiwat et al. |
| 5,145,946 A | 9/1992 | Fujii et al. |
| 5,155,207 A | 10/1992 | Senatore et al. |
| 5,179,194 A | 1/1993 | Kawakami et al. |
| 5,194,580 A | 3/1993 | Koyama et al. |
| 5,235,032 A | 8/1993 | Geibel et al. |
| 5,241,043 A | 8/1993 | Senga |
| 5,266,680 A | 11/1993 | Reed |
| 5,278,283 A | 1/1994 | Miyoshi et al. |
| 5,280,104 A | 1/1994 | Geibel et al. |
| 5,296,579 A | 3/1994 | Geibel et al. |
| 5,314,972 A | 5/1994 | Nesheiwat et al. |
| 5,328,980 A | 7/1994 | Decker et al. |
| 5,334,701 A | 8/1994 | Ash et al. |
| 5,342,920 A | 8/1994 | Imai et al. |
| 5,350,833 A | 9/1994 | Inoue et al. |
| 5,352,768 A | 10/1994 | Stuber et al. |
| 5,354,841 A | 10/1994 | Geibel et al. |
| 5,364,928 A | 11/1994 | Ash |
| 5,438,115 A | 8/1995 | Fahey et al. |
| 5,440,009 A | 8/1995 | Ash et al. |
| 5,475,081 A | 12/1995 | Imai et al. |
| 5,618,981 A | 4/1997 | Shaw |
| 5,635,587 A | 6/1997 | Koyama et al. |
| 5,688,908 A | 11/1997 | Haubs et al. |
| 5,696,282 A | 12/1997 | Shaw et al. |
| 5,744,576 A | 4/1998 | Miyahara et al. |
| 5,756,654 A | 5/1998 | Sase et al. |
| 5,777,069 A | 7/1998 | Tsuda et al. |
| 5,780,583 A | 7/1998 | Lubowitz et al. |
| 5,789,533 A | 8/1998 | Yamanaka et al. |
| 5,804,076 A | 9/1998 | Yamasaki et al. |
| 5,840,830 A | 11/1998 | Miyahara et al. |
| 5,856,433 A | 1/1999 | Koyama et al. |
| 5,894,072 A | 4/1999 | Haubs et al. |
| 5,898,061 A | 4/1999 | Sase et al. |
| 5,905,137 A | 5/1999 | Haubs et al. |
| 5,929,203 A | 7/1999 | Ash et al. |
| 6,201,097 B1 | 3/2001 | Geibel et al. |
| 6,201,098 B1 | 3/2001 | Haubs et al. |
| 6,242,501 B1 | 6/2001 | Green et al. |
| 6,281,326 B1 | 8/2001 | Ash et al. |
| 6,331,608 B1 | 12/2001 | Vidaurri et al. |
| 6,337,062 B1 | 1/2002 | Akiba |
| 6,350,852 B1 | 2/2002 | Haubs et al. |
| 6,388,003 B1 | 5/2002 | Okamoto et al. |
| 6,538,102 B1 | 3/2003 | Haubs et al. |
| 6,562,900 B2 | 5/2003 | Okamoto et al. |
| 6,566,488 B2 | 5/2003 | Okamoto et al. |
| 6,600,009 B2 | 7/2003 | Inoue et al. |
| 6,646,105 B2 | 11/2003 | Shirota |
| 6,734,282 B1 | 5/2004 | Wagener et al. |
| 6,743,890 B2 | 6/2004 | Bando |
| 6,750,319 B2 | 6/2004 | Koyama |
| 6,818,132 B2 | 11/2004 | Haubs et al. |
| 6,939,942 B2 | 9/2005 | Shirota |
| 6,982,312 B2 | 1/2006 | Senga et al. |
| 7,018,574 B2 | 3/2006 | Koyama |
| 7,026,439 B2 | 4/2006 | Senga et al. |
| 7,094,867 B2 | 8/2006 | Miyahara et al. |
| 7,115,704 B2 | 10/2006 | Horiuchi et al. |
| 7,220,817 B2 | 5/2007 | Matsuzaki et al. |
| 7,312,300 B2 | 12/2007 | Mitchell |
| 7,317,072 B2 | 1/2008 | Senga et al. |
| 7,432,339 B2 | 10/2008 | Mitchell |
| 7,501,111 B2 | 3/2009 | Keller et al. |
| 7,504,476 B2 | 3/2009 | Kawama et al. |
| 7,517,946 B2 | 4/2009 | Sato et al. |
| 7,569,656 B2 | 8/2009 | Kagoshima et al. |
| 7,632,915 B2 | 12/2009 | Sato et al. |
| 7,655,748 B2 | 2/2010 | Sato et al. |
| 7,750,111 B2 | 7/2010 | Horiuchi et al. |
| 7,754,795 B2 | 7/2010 | Hintzer et al. |
| 7,754,848 B2 | 7/2010 | Sato et al. |
| 7,767,783 B2 | 8/2010 | Kawama et al. |
| 7,834,133 B2 | 11/2010 | Suzuki et al. |
| 8,076,423 B2 | 12/2011 | Ishio et al. |
| 8,076,447 B2 | 12/2011 | Sato et al. |
| 8,138,302 B2 | 3/2012 | Sato et al. |
| 8,183,336 B2 | 5/2012 | Sato et al. |
| 8,211,997 B2 | 7/2012 | Matsuzaki et al. |
| 8,263,734 B2 | 9/2012 | Fodor et al. |
| 8,329,832 B2 | 12/2012 | Horiuchi et al. |
| 8,426,552 B2 | 4/2013 | Hinokimori et al. |
| 8,440,784 B2 | 5/2013 | Kaiho et al. |
| 8,445,629 B2 | 5/2013 | Hinokimori et al. |
| 8,530,605 B2 | 9/2013 | Konno et al. |
| 8,546,518 B2 | 10/2013 | Unohara et al. |
| 8,609,790 B2 | 12/2013 | Suzuki et al. |
| 8,680,230 B2 | 3/2014 | Konno et al. |
| 8,883,959 B2 | 11/2014 | Hinokimori |
| 8,921,513 B2 | 12/2014 | Luo et al. |
| 8,981,041 B2 | 3/2015 | Kimura et al. |
| 9,068,047 B2 | 6/2015 | Ichinose et al. |
| 9,074,048 B2 | 7/2015 | Kim et al. |
| 9,096,723 B2 | 8/2015 | Ichinose et al. |
| 9,187,641 B2 | 11/2015 | Ouchiyama et al. |
| 9,255,350 B2 | 2/2016 | Taniguchi et al. |
| 9,339,778 B2 | 5/2016 | Koizumi et al. |
| 9,388,283 B2 | 7/2016 | Chiong et al. |
| 9,403,948 B2 | 8/2016 | Chiong et al. |
| 2004/0164443 A1 | 8/2004 | Koyanna |
| 2005/0171332 A1 | 8/2005 | Koyama |
| 2010/0163499 A1 | 7/2010 | Odueyungbo |
| 2011/0319587 A1 | 12/2011 | Hinokimori |
| 2013/0068256 A1 | 3/2013 | Kobayashi et al. |
| 2013/0317159 A1 | 11/2013 | Geibel et al. |
| 2015/0065664 A1 | 3/2015 | Konno et al. |
| 2015/0087776 A1 | 3/2015 | Chiong et al. |

(56) References Cited

U.S. PATENT DOCUMENTS

| | | |
|---|---|---|
| 2015/0087777 A1 | 3/2015 | Chiong et al. |
| 2015/0087778 A1 | 3/2015 | Chiong et al. |
| 2015/0087805 A1 | 3/2015 | Nekkanti et al. |
| 2015/0175748 A1 | 6/2015 | Fodor et al. |

FOREIGN PATENT DOCUMENTS

| | | |
|---|---|---|
| JP | S5847026 | 3/1983 |
| JP | S58125721 | 7/1983 |
| JP | S59168032 | 9/1984 |
| JP | S6055029 | 3/1985 |
| JP | S60235838 | 11/1985 |
| JP | S61228023 | 10/1986 |
| JP | S62285922 | 12/1987 |
| JP | H0280432 | 3/1990 |
| JP | H02160834 | 6/1990 |
| JP | H02302436 | 12/1990 |
| JP | H05271414 | 10/1993 |
| JP | H06145355 | 5/1994 |
| JP | H0649762 | 6/1994 |
| JP | H07118389 | 5/1995 |
| JP | H07228699 | 8/1995 |
| JP | H07242746 | 9/1995 |
| JP | H07292107 | 11/1995 |
| JP | H07330911 | 12/1995 |
| JP | H0841201 | 2/1996 |
| JP | H08100064 | 4/1996 |
| JP | H08134216 | 5/1996 |
| JP | H08151443 | 6/1996 |
| JP | H08157600 | 6/1996 |
| JP | H08157718 | 6/1996 |
| JP | H08170016 | 7/1996 |
| JP | H08170017 | 7/1996 |
| JP | H08176302 | 7/1996 |
| JP | H08193130 | 7/1996 |
| JP | H08193131 | 7/1996 |
| JP | H08198965 | 8/1996 |
| JP | H08198966 | 8/1996 |
| JP | H08198967 | 8/1996 |
| JP | H08231722 | 9/1996 |
| JP | H08231723 | 9/1996 |
| JP | H08239474 | 9/1996 |
| JP | 2543673 | 10/1996 |
| JP | H08253587 | 10/1996 |
| JP | H08269199 | 10/1996 |
| JP | H08269200 | 10/1996 |
| JP | H08283413 | 10/1996 |
| JP | H08319348 | 12/1996 |
| JP | H09104816 | 4/1997 |
| JP | H09124940 | 5/1997 |
| JP | H09194726 | 7/1997 |
| JP | H09296042 | 11/1997 |
| JP | H107798 | 1/1998 |
| JP | H1045911 | 2/1998 |
| JP | H1045912 | 2/1998 |
| JP | H1060113 | 3/1998 |
| JP | H10110034 | 4/1998 |
| JP | H10158399 | 6/1998 |
| JP | H10195197 | 7/1998 |
| JP | H10245434 | 9/1998 |
| JP | H1180355 | 3/1999 |
| JP | H11169870 | 6/1999 |
| JP | H11349566 | 12/1999 |
| JP | 2000136246 | 5/2000 |
| JP | 2000191785 | 7/2000 |
| JP | 2000239383 | 9/2000 |
| JP | 2001040090 | 2/2001 |
| JP | 2001172387 | 6/2001 |
| JP | 2001181394 | 7/2001 |
| JP | 200-648702 * 7/2002 ............. C08G 75/02 |
| JP | 2002187949 | 7/2002 |
| JP | 2002201274 | 7/2002 |
| JP | 2002201275 | 7/2002 |
| JP | 2002212292 | 7/2002 |
| JP | 2003026803 | 1/2003 |
| JP | 2003275773 | 9/2003 |
| JP | 2004107567 | 4/2004 |
| JP | 2004182753 | 7/2004 |
| JP | 2004352923 | 12/2004 |
| JP | 2005041922 | 2/2005 |
| JP | 2005047953 | 2/2005 |
| JP | 2005264030 | 9/2005 |
| JP | 2005344045 | 12/2005 |
| JP | 2006016567 | 1/2006 |
| JP | 2007077209 | 3/2007 |
| JP | 2007314803 | 12/2007 |
| JP | 2008075055 | 4/2008 |
| JP | 2008239767 | 10/2008 |
| JP | 2008248153 | 10/2008 |
| JP | 2008248154 | 10/2008 |
| JP | 4256506 | 4/2009 |
| JP | 2009185143 | 8/2009 |
| JP | 2010037518 | 2/2010 |
| JP | 2010126621 | 6/2010 |
| JP | 4994997 | 8/2012 |
| JP | 2013023586 | 2/2013 |

OTHER PUBLICATIONS

International Search Report and Written Opinion for PCT/US16/17080, dated Apr. 21, 2016, 9 pages.
Related U.S. Patent Applications Form.
Fahey et al., Poly(*p*-phenylene sulfide) Synthesis: A Step-Growth Polymerization with Unequal Step Reactivity, *Macromolecules* 1997, pp. 387-393, 7 pages.
Venkata M. Nekkanti et al., U.S. Appl. No. 15/045,296, filed Feb. 17, 2016, Method for Forming a Low Viscosity Polyarylene Sulfide.
Hendrich A. Chiong, U.S. Appl. No. 14/045,301, filed Feb. 17, 2016, Method for Forming a High Molecular Weight Polyarylene Sulfide.
Hendrich A. Chiong, U.S. Appl. No. 15/045,313, filed Feb. 17, 2016, Method of Polyarylene Sulfide Precipitation.

* cited by examiner

TECHNIQUE FOR FORMING A HIGH MELT VISCOSITY POLYARYLENE SULFIDE

RELATED APPLICATIONS

The present application claims priority to U.S. Provisional Application Ser. Nos. 62/137,860, filed on Mar. 25, 2015; 62/197,655, filed on Jul. 28, 2015; and 62/206,155 filed on Aug. 17, 2015, which are incorporated herein in their entirety by reference thereto.

BACKGROUND OF THE INVENTION

Polyarylene sulfides are generally formed via a reaction of a dihaloaromatic monomer with an alkali metal sulfide in the presence of an organic amide solvent. The reaction often occurs over multiple stages during which a low molecular weight prepolymer is initially formed, and then the molecular weight is increased in a subsequent step. The stages are generally carried out in a batch-wise fashion within a single reactor. Unfortunately, polyarylene sulfides formed from these processes tend to have too low of a melt viscosity for use in certain types of applications. As such, a need currently exists for a method of forming high viscosity polyarylene sulfides.

SUMMARY OF THE INVENTION

In accordance with one embodiment of the present invention, a method for forming a polyarylene sulfide is disclosed. The method comprises reacting a sulfur source with a dihaloaromatic compound during a first stage to form an arylene sulfide prepolymer having halogen end groups; and thereafter, reacting the arylene sulfide prepolymer with a secondary sulfur source during a second stage to form the polyarylene sulfide. The normalized sulfur ratio, which is determined by dividing the moles of sulfur added by the moles of repeating units in the prepolymer, and then multiplying by 100, is from about 1.0 to about 5.0. The polyarylene sulfide has a melt viscosity of about 250 poise or more, as determined in accordance with ISO Test No. 11443:2005 at a temperature of 310° C. and shear rate of 1,200 s$^{-1}$.

BRIEF DESCRIPTION OF THE FIGURES

The present invention may be better understood with reference to the following figures.

DETAILED DESCRIPTION

Figure 1:
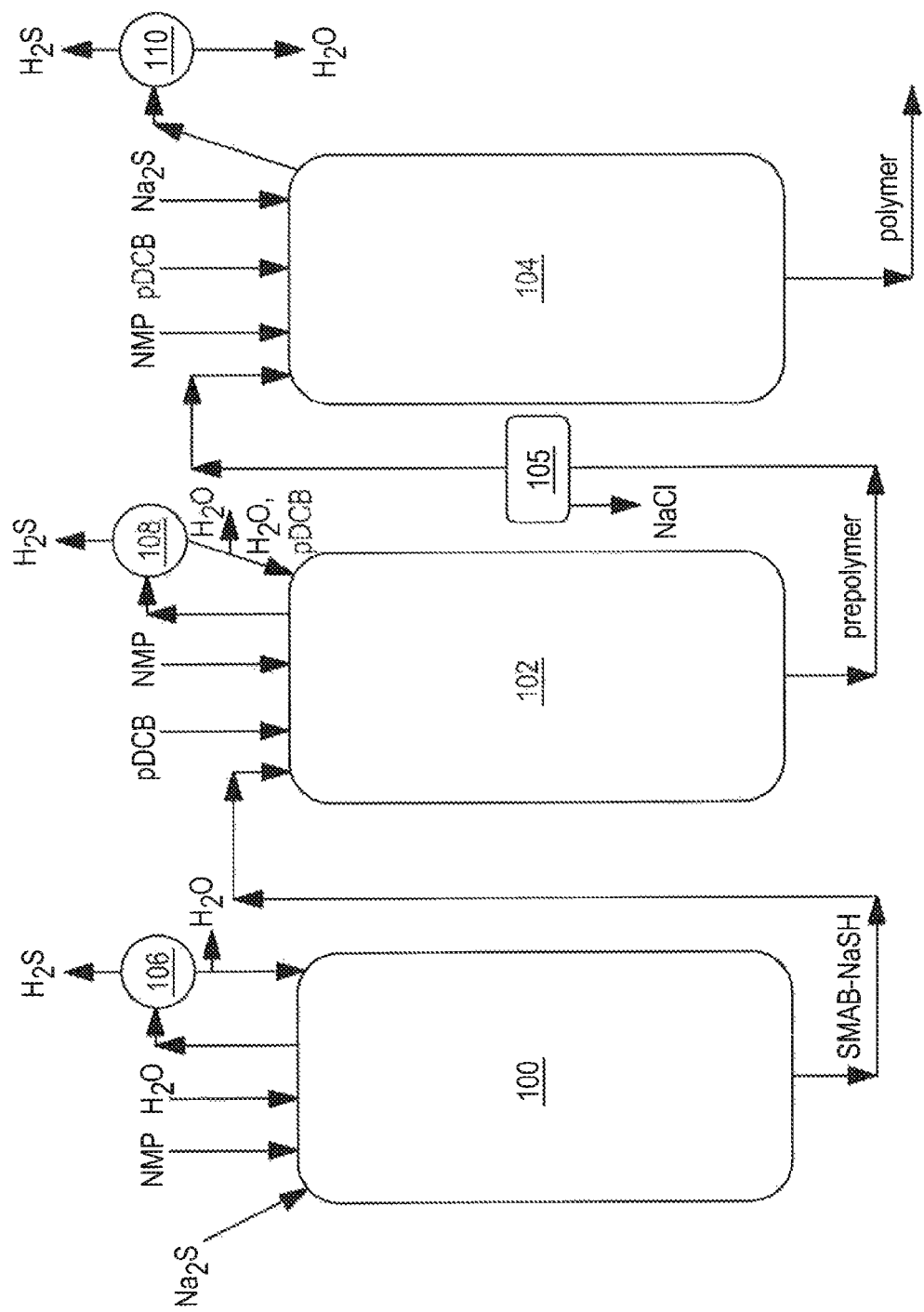
FIG. 1 is a flow diagram of one embodiment of the method of the present invention.

It is to be understood by one of ordinary skill in the art that the present discussion is a description of exemplary embodiments only, and is not intended as limiting the broader aspects of the present invention.

Generally speaking, the present invention is directed to a multi-stage method for forming a polyarylene sulfide. More particularly, the method includes a first polymerization stage during which a sulfur source is reacted with a dihaloaromatic compound to form an arylene sulfide prepolymer. Once formed, the prepolymer is reacted with a secondary sulfur source during a second polymerization stage. The present inventors have discovered that through selective control over the total amount of sulfur employed during the second stage relative to the total amount of halogen (e.g., chlorine) end groups on the prepolymer, a polyarylene sulfide can be formed that has both a high molecular weight and high melt viscosity. The melt viscosity of the polyarylene sulfide may, for instance, be about 250 poise or more, in some embodiments about 400 poise or more, in some embodiments about 600 poise or more, in some embodiments about 800 poise or more, in some embodiments about 1,200 poise or more, and in some embodiments, from about 1,400 poise to about 5,000 poise, such as determined in accordance with ISO Test No. 11443:2005 (technically equivalent to ASTM D3835-08) at a temperature of 310° C. and shear rate of 1,200 s$^{-1}$. Notably, such a high melt viscosity can be achieved for the neat polymer (without the need for additional additives). The weight average molecular weight of the polyarylene sulfide may likewise be about 18,000 Daltons or more, in some embodiments about 19,000 Daltons or more, and in some embodiments, from about 20,000 to about 50,000 Daltons. Molecular weight may be determined by converting the polymer to PPSO by oxidation with a mixture of cold HNO$_3$ (50%) in a trifluoroacetic acid mixture, dissolving the PPSO in warm hexafluoroisopropanol (HFIP) for 1 hour, and then analyzing for molecular weight by GPC equipped with PSS-hexafluoroisopropanol (HFIP) gel columns, which may be fitted with an HFIP-gel guard column using HFIP as mobile phase and refractive index as a detector.

Various embodiments of the present invention will now be described in further detail.

I. First Polymerization Stage

As noted, the multi-stage method of the present invention includes a first polymerization stage during which a sulfur source is reacted with a dihaloaromatic compound to form an arylene sulfide prepolymer. The prepolymer may, for instance, have a weight average molecular weight of from about 3,000 to about 18,000 Daltons, in some embodiments from about 5,000 to about 17,000 Daltons, and in some embodiments, from about 10,000 to about 16,000 Daltons.

The sulfur source may be an alkali metal sulfide, such as lithium sulfide, sodium sulfide, potassium sulfide, rubidium sulfide, cesium sulfide, etc., as well as derivatives, hydrates, or complexes thereof. For instance, a sodium sulfide hydrate may be prepared from sodium hydrogen sulfide and sodium hydroxide. The sulfur source may also be a complex that is formed by reacting an alkali metal sulfide with an organic amide solvent (e.g., N-methyl-2-pyrrolidone (NMP)). In certain embodiments, the alkali metal sulfide used to form such a complex may be sodium sulfide or a sodium sulfide hydrate prepared by reacting sodium hydrogen sulfide and sodium hydroxide. When a combination of alkali metal hydrogen sulfide and alkali metal hydroxide are used to form the alkali metal sulfide, the molar ratio of alkali metal hydroxide to alkali metal hydrogen sulfide may be between about 1.00 and about 1.03. Regardless, the resulting complex includes sodium methylaminobutyrate ("SMAB") and sodium hydrogen sulfide ("NaSH") (collectively referred to as "SMAB-NaSH"). One example of a reaction scheme that can be used to form the SMAB-NaSH complex is set forth below:

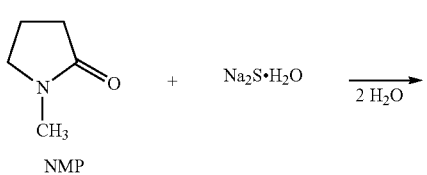

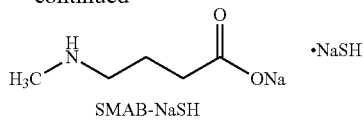
SMAB-NaSH

The dihaloaromatic compound may be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds may include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom may be fluorine, chlorine, bromine or iodine, and two halogen atoms in the same dihalo-aromatic compound may be the same or different from each other. In one embodiment, o-dichlorobenzene, m-dichlorobenzene, p-dichlorobenzene or a mixture of two or more compounds thereof is used as the dihalo-aromatic compound. As is known in the art, it is also possible to use a monohalo and/or polyhalo (3 or more) compound, which is not necessarily aromatic, in combination with the dihaloaromatic compound to form end groups of the polyarylene sulfide or regulate the polymerization reaction and/or the molecular weight of the polyarylene sulfide. Nevertheless, the molar ratio of the dihaloaromatic compound to the sulfur source (e.g., SMAB-NaSH) employed during the first stage may be from about 0.5 to about 2.0, in some embodiments from about 0.8 to about 1.5, and in some embodiments, from about 1.0 to about 1.4.

The prepolymer is typically formed in the presence of an organic amide solvent. Exemplary organic amide solvents may include, without limitation, N-methyl-2-pyrrolidone ("NMP"); N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof. The molar ratio of the sulfur source to the organic amide solvent (includes the organic solvent added and any solvent remaining from formation of the SMAB-NaSH complex) may, for instance, range from about 2.0 to about 4.0, in some embodiments from about 2.2 to about 3.0, and in some embodiments, from about 2.5 to about 3.0. The molar ratio of water to the sulfur source may likewise range from about 2.0 to about 4.0, in some embodiments from about 2.2 to about 3.0, and in some embodiments, from about 2.5 to about 3.0.

The first stage polymerization reaction may generally be carried out in one or multiple steps within a temperature range from about 150° C. to about 260° C., in some embodiments from about 180° C. to about 255° C., and in some embodiments, from about 200° C. to about 250° C. The duration of the first polymerization stage may be, e.g., from about 0.5 to about 15 hours, or from about 1 to about 5 hours. After the reaction, a mixture is formed that may include the prepolymer along with various byproducts of the reaction, such as an organic solvent, unreacted dihaloaromatic compounds, salts formed as a by-product of the polymerization reaction, etc. For example, the amount of salts in the mixture may range from about 0.05 vol. % to about 0.25 vol. %, and in some embodiments, from about 0.1 vol. % to about 0.2 vol. %. Salts included in the reaction mixture may include those formed as a byproduct during the reaction as well as other salts added to the reaction mixture, for instance as a reaction promoter. The salts may be organic or inorganic, e.g., they may include any combination of organic or inorganic cations with organic or inorganic anions. They may be at least partially insoluble in the reaction medium and have a density different from that of the liquid reaction mixture. According to one embodiment, at least a portion of the salts in the prepolymer mixture may be removed therefrom. For instance, the salts may be removed by use of screens or sieves as has been utilized in traditional separation processes. A salt/liquid extraction process may alternatively or additionally be utilized in separating the salt from the prepolymer mixture. In one embodiment, a hot filtration process may be employed in which the solution is filtered at a temperature at which the prepolymer is in solution and the salts are in the solid phase. According to one embodiment, a salt separation process may remove about 95% or more of the salts including in the prepolymer solution that exits the second reactor. For instance greater than about 99% of the salts may be removed from the prepolymer solution.

II. Second Polymerization Stage

After the first stage prepolymer polymerization reaction and any optional salt filtration, a second stage polymerization reaction is employed to increase the molecular weight of the prepolymer. During the second stage, the prepolymer is further reacted with a secondary sulfur source, optionally in combination with a dihaloaromatic compound (e.g., pDCB). As noted above, selective control over the total amount of sulfur employed during this stage relative to the total amount of halogen end groups on the prepolymer can result in a final polymer having both a high molecular weight and high melt viscosity. For example, the "normalized sulfur ratio", which is determined by dividing the moles of sulfur added by the moles of repeating units in the prepolymer, and then multiplying by 100, may be from about 1.0 to about 5.0, in some embodiments from about 1.1 to about 4.0, and in some embodiments, from about 1.2 to about 2.5. The halogen end groups may likewise constitute from about 0.5 wt. % to about 8 wt. %, in some embodiments from about 0.6 wt. % to about 6 wt. %, and in some embodiments, from about 0.8 wt. % to about 4 wt. %, based on the weight of the arylene sulfide prepolymer.

The primary source of sulfur during the second polymerization reaction stems from the prepolymer. That is, about 50 mol. % or more, in some embodiments about 70 mol. % or more, and in some embodiments, from about 85 mol. % to about 95 mol. % of the sulfur employed during the second polymerization reaction stems from the prepolymer itself. The secondary sulfur source may be any sulfur-containing monomer such as described above (e.g., alkali metal sulfide, alkali metal sulfide hydrate, SMAB-NaSH, etc.). The secondary sulfur source is typically employed in an amount of about 1.5 wt. % or more, from about 1.8 wt. % to about 5.0 wt. %, and in some embodiments, from about 2.0 wt. % to about 4.0 wt. % based on the weight of the prepolymer and as determined by dividing the weight of the secondary sulfur source by the weight of the prepolymer, and then multiplying by 100.

The dihaloaromatic compound employed during the second polymerization stage can be the same or different than the dihaloaromatic compound employed in the first stage. Regardless, to achieve the desired melt viscosity, the total amount of the dihaloaromatic compounds present during the second polymerization reaction is typically about 1 wt. % or more, in some embodiments about 1.1 wt. % to about 3.0 wt. %, and in some embodiments, from about 1.2 wt. % to about 2.0 wt. %, based on the weight of the polyarylene sulfide formed during the stage and as determined by dividing the weight of the dihaloaromatic compounds by the weight of the polymer, and then multiplying by 100. The post-reaction mixture may include an amount of residual unreacted dihaloaromatic compounds in conjunction with the polyarylene sulfide. For instance, following the second polymerization reaction, about 0.5 wt. % or less, about 0.45 wt. % or less or about 0.4 wt. % or less, for instance from about 0.01 wt. % to about 0.45 wt. % of the dihaloaromatic compound with regard to the weight of the polyarylene sulfide can remain unreacted as residual dihaloaromatic monomer in the post-reaction solution.

The second stage polymerization reaction may occur in the presence of an organic amide solvent, such as described above. In such cases, the molar ratio of the solvent to the repeating unit in the final polymer may also be selectively controlled. For instance, this molar ratio may range from about 2.0 to about 5.5, in some embodiments from about 2.2 to about 5.0, and in some embodiments, from about 2.5 to about 4.5. The ratio of the solvent (includes solvent added and also remaining in prepolymer mixture) to sulfur (includes sulfur monomers added and in prepolymer mixture) in the second stage may also be relatively low, such as about 3.0 or less, and in some embodiments, from about 2.0 to about 2.5. While an organic amide solvent is typically employed, the second polymerization reaction can optionally be carried out at near anhydrous conditions in which the molar ratio of water to sulfur (includes sulfur monomers added and in prepolymer mixture) is about 5 or less, in some embodiments about 4 or less, and in some embodiments, from 0 to about 1. The low water content during the second polymerization reaction can increase the polymerization rate and the polymer yield as well as reduce formation of undesired side reaction by-products as the conditions are favorable for the nucleophilic aromatic substitution of the polymerization reaction.

The second stage polymerization reaction may also occur in one or multiple steps within a temperature range of from about 200° C. to about 285° C., in some embodiments from about 240° C. to about 280° C., and in some embodiments, from about 250° C. to about 270° C. Regardless of the exact ranges, the temperature at which the second stage polymerization occurs is typically greater than the temperature at which the first stage polymerization occurs. The duration of the second polymerization stage can be, for example, from about 0.5 to about 20 hours, or from about 1 to about 10 hours.

If desired, the polymerization stages may occur in different reactors. The utilization of separate reactors for each of the stages may decrease cycle time, as the total cycle time may be equal to that of the slowest stage, rather than the sum of all stages as in a single reactor system. In addition, the utilization of separate reactors may decrease capital costs, as smaller reactors may be utilized than would be necessary for the same size batch in a single reactor system. Moreover, as each reactor need only meet the specifications of the stage being carried out in that reactor, a single, large reactor that meets the most stringent parameters of all stages of the polymerization process is no longer necessary, which may further decrease capital costs.

Referring to FIG. 1, for example, one embodiment of the multi-stage polymerization method of the present invention is shown that includes different reactors. In the illustrated embodiment, a vessel 100 is initially employed to form a SMAB-NaSH complex in the manner described above. During the formation of the complex, the pressure within the vessel 100 can be held at or near atmospheric pressure. To maintain the low pressure reaction conditions, vapor can be removed from the reactor. The main constituents of the vapor can include water and hydrogen sulfide by-product. As illustrated in FIG. 1, hydrogen sulfide of the vapor can be separated at a condenser 106 with liquid constituents returned to the reactor. If desired, a portion of the water from the mixture used to form the SMAB-NaSH complex separated at the condenser 106 can be returned to the vessel 100 to maintain the reaction conditions. Another portion of the water can be removed so as to dehydrate the SMAB-NaSH solution formed in this stage such that the water concentration during the first polymerization reaction is relatively low. For instance, the molar ratio of oxygen to sulfur (or water to sulfur-containing monomer (e.g., SMAB-NaSH)) in the solution exiting the vessel 100 can be about 4.0 or less, in some embodiments about 1.5 or less, and in some embodiments, from about 0.1 to about 1.0.

The vessel employed for the SMAB-NaSH formation can be stainless steel, though improved corrosion can be obtained by use of other materials such as a nickel-based alloy or titanium. The materials in the vessel 100 can be heated to a temperature of, for example, between about 140° C. and about 220° C., for instance from about 150° C. to about 215° C., or from about 165° C. to about 210° C. during the complex formation reaction. The complex formation reaction is an exothermic reaction, and suitable temperature control mechanisms can be utilized to maintain desired reaction conditions, as needed. The reaction can be carried out in a batch-wise or continuously.

Once formed, the SMAB-NaSH complex can then be fed to a first polymerization reactor 102 to conduct the first polymerization stage and form an arylene sulfide prepolymer. In this embodiment, pDCB and NMP are also supplied to the first reactor 102, although other reactants may of course be employed as noted above. If desired, the reaction may be carried out under an inert atmosphere, such as nitrogen, and at an increased pressure. For instance, the pressure in the first reactor 102 may be from about 500 kPa to about to about 1600 kPa, in some embodiments from about 600 kPa to about 1500 kPa, and in some embodiments, from about 700 kPa to about 1400 kPa. The reactor 102 can also include a vapor outlet for removal of vapor during the polymerization reaction in order to maintain the desired pressure level. For instance, the first reactor 102 can include a pressure relief valve as is known in the art. Vapor removed from the reactor 102 can be condensed and separated as at separator 108 to recover unreacted monomer for return to the reactor 102. A portion of the water from the vapor can be removed and optionally returned to the reactor to maintain the low water conditions during the polymerization reaction. A small amount of water in the reactor can generate reflux in the top of the reactor 102, which can improve separation between the water phase and the organic solvent phase in the reactor. The termination of the first polymerization reaction during which the prepolymer is formed is generally that point at which the conversion rate of the dihaloaromatic monomer in the second reactor 102 reaches not less than about 50 mol %, not less than about 70 mol %, or not less than about 90 mol % of the theoretical conversion. The theoretical conversion of the dihaloaromatic monomer can be calculated from one of the following formulas:

(a) In the case wherein the dihaloaromatic monomer has been added in excess (by molar ratio) of the alkali metal sulfide:

$$\text{Conversion rate} = \frac{X-Y}{X-Z} \times 100$$

(b) In the cases other than (a):

$$\text{Conversion rate} = \frac{X-Y}{X} \times 100$$

wherein X is the amount of the charged dihaloaromatic monomer; Y is the remaining amount of the dihaloaromatic monomer and Z is the excessive amount of dihaloaromatic monomer in moles.

(c) In the case other than (a) or (b)

$$\text{Conversion rate} = A/B * 100$$

wherein A is the total weight of salt collected after removal of the residual polymer and other species other than salt by-product; B is the theoretical weight of salt which is two times the molar amount of the effective sulfide present during the polymerization.

The apparatus used for the first reactor 102 is not especially limited, although it is typically desired to employ an apparatus that is commonly used in formation of high viscosity fluids at increased pressure. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. The first reactor 102 can be stainless steel, though improved corrosion can be obtained by use of other materials such as a nickel-based alloy or titanium.

A prepolymer mixture exits the first reactor 102, which can include the prepolymer and optionally an organic amide solvent, unreacted dihaloaromatic compounds, water, and other by-products of the reaction, such as salts, formed during the polymerization reaction. According to one embodiment, at least a portion of the salts in the prepolymer solution can be removed from the mixture at a separation unit 105, such as described above. Removal of salts prior to this second polymerization reaction can simplify final polymer separation processes as well as increase the reaction rate of the second polymerization as a lower sulfur to solvent ratio may be used in the reaction, effectively increasing the polymer concentration and formation rate. In addition, by carrying out a salt separation process prior to the second polymerization reaction, the physical capacity of the third reactor for the reactants can be increased.

Referring again to FIG. 1, the second stage polymerization reaction can occur in a second polymerization reactor 104 within which the prepolymer is reacted with a dihaloaromatic compound (e.g., pDCB). As discussed, a secondary sulfur source is also supplied to the second reactor 104 to help achieve the desired molar ratio of sulfur to halogen end groups. While sodium sulfide is used as the secondary source in FIG. 1, it should be understood that others sulfur sources may also be employed, such as sodium hydrogen sulfide, SMAB-NaSH, etc.

The second reactor 104 may optionally include a vapor outlet for removal of vapor during the second polymerization reaction in order to maintain the low pressure in the reactor. For instance, the second reactor 104 can include a pressure relief valve as is known in the art. Vapor removed from the second polymerization can be condensed and separated as at a separator 110 that can separate, e.g., hydrogen sulfide from water of the vapor. The removal of the water can also help to maintain the desired low water conditions in the second reactor 104. In one embodiment, water and/or solvent can be removed from the reaction solution by a distillation process in order to control the relative amount of the water and/or solvent present during the second polymerization reaction. Any distillation or other fluid separation process can be utilized. In one particular embodiment, a flash distillation process may be employed. A distillation can be carried out in one embodiment either prior to or following feed of the solution from reactor 102 to reactor 104. For example, a flash distillation can take place following transfer of the reaction solution from reactor 102 to reactor 104. According to this embodiment, the reactor can be quickly depressurized from the pressure conditions during the first polymerization reaction (e.g., from about 500 kPa to about 1600 kPa) to release superheated vapor containing water and solvent. A flash distillation process can also serve to reduce the temperature of the mixture prior to the second polymerization reaction. For instance, the temperature of the feed can be reduced from about 250° C. (or higher) to about 220° C. (or less) upon the flash distillation process.

Following the second polymerization reaction, the polyarylene sulfide may be discharged from the second reactor 104, typically through an extrusion orifice fitted with a die of desired configuration, cooled, and collected. Commonly, the polyarylene sulfide may be discharged through a perforated die to form strands that are taken up in a water bath, pelletized and dried. The polyarylene sulfide may also be in the form of a strand, granule, or powder. The pH of the resulting polymer can be from about 3 to about 10. If desired, the pH of the reaction mixture can be adjusted prior to the second polymerization. For instance, an acid or base can be added to the reaction mixture prior to the second polymerization reaction and the resulting product reaction mixture including the higher molecular weight polyarylene sulfide can have a pH of from about 3 to about 10.

The apparatus for use as the second reactor 104 is not especially limited, and can be the same or different than the first reactor 102. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. The reactor 104 can be stainless steel, though improved corrosion can be obtained by use of other materials such as a nickel-based alloy or titanium.

Figure 2:
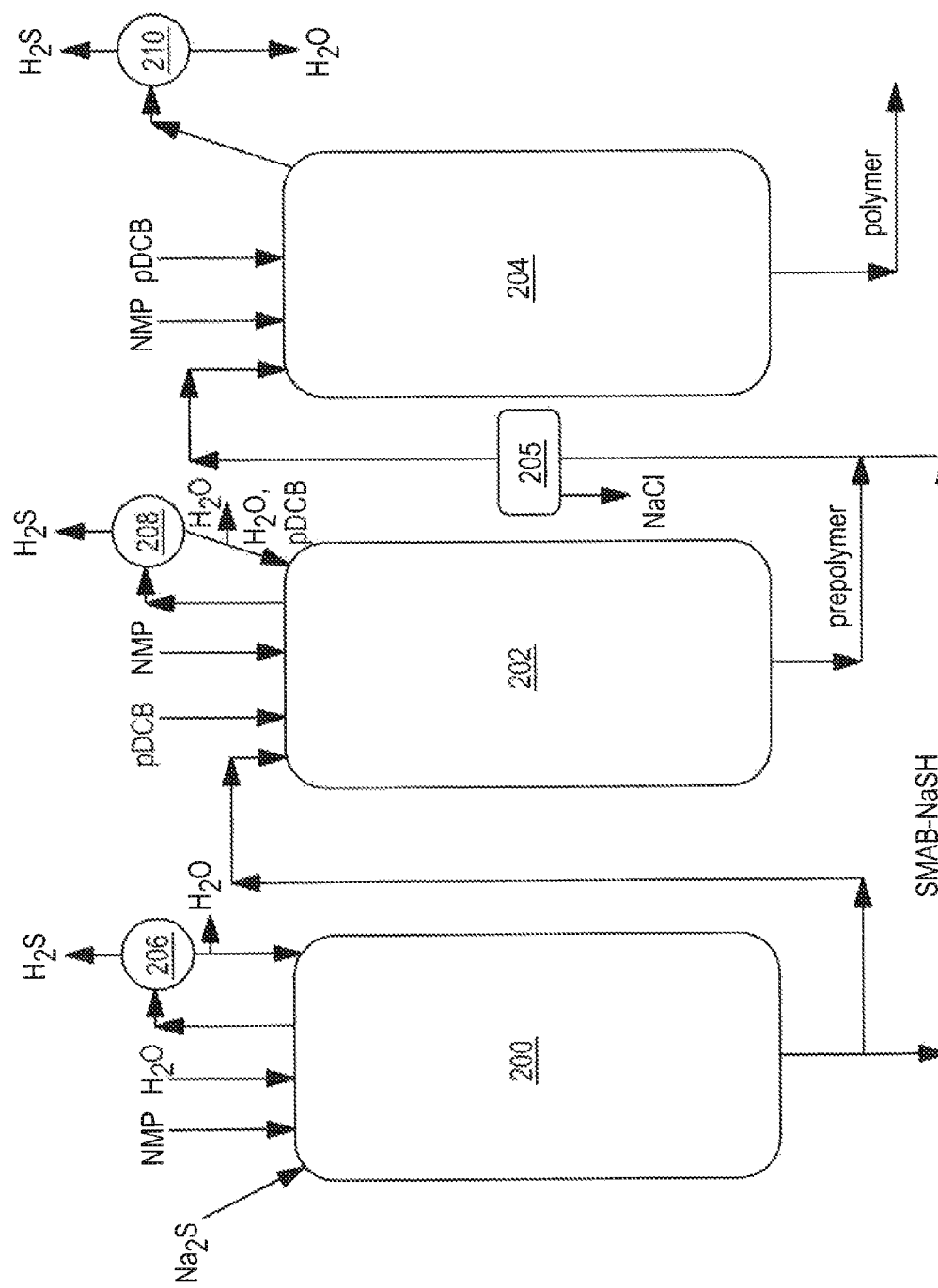
FIG. 2 is a flow diagram of another embodiment of the method of the present invention.

FIG. 2 illustrates another embodiment of a multi-stage polyarylene sulfide polymerization method that can be employed in the present invention. As can be seen, this method is similar to the multi-stage method of FIG. 1 and includes a vessel 200, a first reactor 202 and a second reactor 204. The feed to the vessel 200 can include a sulfur-containing monomer, such as an alkali metal sulfide (e.g., $Na_2S$), an organic amide solvent (e.g., NMP), and water. The vessel 200 can include a vapor treatment stream including a condenser 206 similar to that of FIG. 1. The sulfur-containing organic complex formed in the vessel 200 can be fed to the first reactor 202 in conjunction with a dihaloaromatic monomer (pDCB) and solvent (NMP) to form a prepolymer via a first polymerization reaction. As shown, the first reactor 202 can include a vapor treatment stream including a condenser 208 similar to that of FIG. 1. The prepolymer mixture that exits the first reactor 202 can be subjected to optional salt separation at separation unit 205 before entering the second reactor 204 for the second polymerization reaction.

In the embodiment of FIG. 2, the secondary sulfur source that is fed to the second reactor 204 is formed from the SMAB-NaSH complex that was formed in the vessel 200. Utilization of the complex in both the first and second polymerization reactions can improve overall efficiency and decrease costs. The complex can be fed to the second reactor 204 in conjunction with dihaloaromatic monomer and additional solvent as necessary and the molecular weight of the prepolymer can be increased as desired. As shown, the second reactor 204 can include a vapor treatment stream including a condenser 210 and water can be removed from the second reactor 204 in order to maintain low water and low pressure during the second polymerization reaction.

Once formed, the resulting polymer can be subjected to any of a variety of post treatments as is known in the art to purify or otherwise improve the characteristics of the polyarylene sulfide. For example, a second filtration process can be carried out that can remove any additional salt from the product mixture, for instance any salt formed as the molecular weight of the prepolymer is increased during the second polymerization reaction. In one embodiment, the polyarylene sulfide can be subjected to a crystallization process following the second polymerization reaction. The polyarylene sulfide may also be washed with a liquid media. For instance, the polyarylene sulfide may be washed with water, acetone, N-methyl-2-pyrrolidone, a salt solution, and/or an acidic media such as acetic acid or hydrochloric acid. The polyarylene sulfide can be washed in a sequential manner that is generally known to persons skilled in the art. The polyarylene sulfide can be subjected to a hot water washing process. The temperature of a hot water wash can be at or above about 100° C., for instance higher than about 120° C., higher than about 150° C., or higher than about 170° C. Generally, distilled water or deionized water can be used for hot water washing. In one embodiment, a hot water wash can be conducted by adding a predetermined amount of the polyarylene sulfide to a predetermined amount of water and heating the mixture under stirring in a pressure vessel. By way of example, a bath ratio of up to about 200 grams of polyarylene sulfide per liter of water can be used. Following the hot water wash, the polyarylene sulfide can be washed several times with warm water, maintained at a temperature of from about 10° C. to about 100° C. A wash can be carried out in an inert atmosphere to avoid deterioration of the polymer.

In one embodiment, organic solvent washing can be combined with hot water washing and/or warm water washing. Likewise, a washing solution can be employed that a combination of water and an organic solvent (e.g., N-methyl pyrrolidone). For example, the solution may contain water (e.g., deionized water) in an amount of from about 30 wt. % to about 70 wt. %, in some embodiments from about 35 wt. % to about 65 wt. %, and in some embodiments, from about 40 wt. % to about 60 wt. %. The washing solution also contains the organic solvent in an amount of from about 30 wt. % to about 70 wt. %, in some embodiments from about 35 wt. % to about 65 wt. %, and in some embodiments, from about 40 wt. % to about 60 wt. %. When a high-boiling-point organic solvent such as N-methylpyrrolidone is used, the residual organic solvent can be removed by washing with water or warm water after the organic solvent washing, and distilled water or deionized water can be used for this washing.

The resulting polyarylene sulfide that is formed according to the method of the present invention may generally contain repeat units of the formula (I):

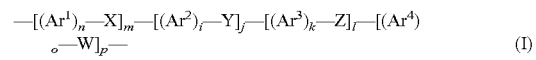

$$—[(Ar^1)_n—X]_m—[(Ar^2)_i—Y]_j—[(Ar^3)_k—Z]_l—[(Ar^4)_o—W]_p— \quad (I)$$

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —$SO_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide can typically include more than about 30 mol %, more than about 50 mol %, or more than about 70 mol % arylene sulfide (—AR—S—) units. In one embodiment the polyarylene sulfide includes at least 85 mol % sulfide linkages attached directly to two aromatic rings. In one embodiment, the polyarylene sulfide formed by the method can be a polyphenylene sulfide, defined herein as containing the phenylene sulfide structure —$(C_6H_4—S)_n$— (wherein n is an integer of 1 or more) as a component thereof.

In addition to having a relatively high molecular weight and melt viscosity, the polyarylene sulfide formed according to the multi-stage method of the present invention can also exhibit a variety of other beneficial properties. For instance, the polyarylene sulfide may have a relatively low yellowness index, such as about 12 or less, in some embodiments about 10 or less, and in some embodiments, from about 1 to about 9, such as determined according to the procedure of ASTM E313 (illuminant D65; 10 degree observer). Beneficially, the polyarylene sulfides can have a low yellowness index as formed, i.e., neat, without the inclusion of any additives to the polymer.

The bulk density of the polymer can generally be between about 0.2 grams per cubic centimeter ($g/cm^3$) and about 1.5 $g/cm^3$, for instance between about 0.3 $g/cm^3$ and about 1 $g/cm^3$ or between about 0.5 $g/cm^3$ and about 0.9 $g/cm^3$ as determined according to ISO Test No. 1183 (technically equivalent to ASTM D792). The volatile content of the polymer can be about 0.5 wt. % or less, for instance about 0.3 wt. % or less, based upon weight loss following vacuum drying. The polyarylene sulfide can also have low impurities, for instance less than about 10,000 ppm solvent, less than about 1100 ppm dihaloaromatic monomer, less than about 100 ppm sodium chloride, and/or less than about 0.5% ash.

The thermal properties of the polyarylene sulfide can also be beneficial. For instance, the crystallization temperature, $T_{c2}$, can be between about 190° C. and about 300° C., for example between about 200° C. and about 265° C., as determined by differential scanning calorimetry, for instance as described in ISO Standard 10350. The glass transition temperature can be between about 90° C. and about 100° C., for instance between about 90° C. and about 95° C. as determined according to ISO standard 11357. The melting temperature can be between about 270° C. and about 300° C. as determined according to ISO standard 11357.

The resulting polyarylene sulfide may also have a good particle size distribution. For instance, the $d_{10}$ value can be from about 15 micrometers to about 30 micrometers, the $d_{50}$ value can be from about 70 micrometers to about 100 micrometers, and the $d_{90}$ value can be from about 100 micrometers to about 150 micrometers. The median diameter of the particles can be from about 100 micrometers to about 1000 micrometers. In one embodiment, about 95% or more of the particles can be between about 50 micrometers and about 150 micrometers in particle size. For instance, about 0.5 wt. % or less of the particles can have a diameter of greater than about 2800 micrometers, and about 10 wt. % or less of the polymers can have a diameter of less than about 110 micrometers. Particle size analysis can be carried out via laser diffraction of sample particles according to know methodology. The polyarylene sulfide can also exhibit a high degree of porosity. For instance, the polyarylene sulfide can exhibit a pore area of about 30 m²/g or more, and in some embodiments from about 35 m²/g to about 60 m²/g. Pore area can be determined according to DIN 66 133. This method is based on the intrusion of mercury as a non-wetting liquid into a solid and porous material under pressure. Depending on pore size a specific pressure has to be applied in order to push mercury into the pores against the opposing force of the mercury's surface tension. By registration of the needed pressure pore size and porosity can be calculated via the Washburn equation.

The present invention may be better understood with reference to the following examples.

EXAMPLE

A 2 liter pressure reactor was charged with 653.0 g NMP, 29.0 g $H_2O$, NaOH (amount charged is such that Na:S=1.00) and NaSH containing 55.59% NaSH and 1.50% $Na_2S$ as set forth in the table below. The reactor was sealed and flushed with nitrogen to displace headspace. The mixture was heated to 150° C. (2-4° C./min), then to 160° C. (0.25° C./min), then to 180° C. (0.5° C./min), and then to 195° C. (1.5° C./min). The mixture was further held at 195° C. for another 30 minutes. After these steps, the distillate was collected and analyzed by gas chromatography to determine the amount of NMP removed during dehydration. A sample of the distillate was also analyzed for sulfide to determine the amount of sulfur lost as hydrogen sulfide during dehydration. The final composition of the SMAB-NaSH mixture contained the following stoichiometric components:

| Run | Moles of S | Molar Ratio of Na:S | Molar Ratio of Bound $H_2O$:S | Molar Ratio of NMP:S |
|---|---|---|---|---|
| 1 | 1.981 | 1.029 | 1.53 | 2.93 |
| 2 | 2.016 | 1.032 | 1.51 | 2.89 |
| 3 | 1.956 | 1.079 | 1.52 | 3.29 |

The SMAB-NaSH mixture was cooled to room temperature and charged with p-dichlorobenzene (the amount such that the molar ratio of pDCB:S is 1.10) and NMP (amount such that the molar ratio of NMP:S is about 3.0). The reactor was sealed and flushed with nitrogen to displace the headspace. The reactor was heated to 235° C. and held for 1 hours, then heated to 245° C. (0.33° C./min) and held at 245° C. for 3 hours. Following formation of the prepolymer, the reactor was maintained at 350 kPa and a filtration to remove salt was carried out at 235-240° C. The filtrate was collected in a heated second reactor. The salt filter cake was washed four times with 300 grams of NMP, which was preheated to at least 240° C. in the first polymerization reactor. After each cake washing, the second reactor was re-arranged to conduct the distillation of NMP, unreacted pDCB, byproduct $H_2O$ and other volatiles. The total amounts of NMP used in the cake washing, unreacted pDCB and $H_2O$ byproduct were removed during the distillation steps.

After the distillation steps, the reactor was cooled down and additional SMAB-NaSH complex was added to the second reactor. The amount of SMAB-NaSH added was such that the "normalized sulfur ratio", which is determined by dividing the moles of sulfur added by the moles of repeating units in the prepolymer in the reactor, and then multiplying by 100, was 2.13 for Run 1, 1.83 for Run 2, and 1.52 for Run 3. Additional $H_2O$ was also added such that the molar ratio of $H_2O$:S was 3.0. NMP was also added to obtain a molar ratio of NMP to the amount of repeating units in the polymer was about 3. The reactor was sealed and flushed with nitrogen to displace the headspace. The second polymerization was conducted by heating the reactor to 265° C. and holding the temperature for 3 hours. After the polymerization, the temperature was allowed to cool down to obtain the final polymer. To isolate the PPS, the slurry was washed with acetone (4 times), with water (5 times), then with 0.5% acetic acid (1 time), then with water (2 times). The PPS was dried under vacuum at 110° C.

The melt viscosity of the final polymer was measured and determined to be 1,479 Pa-s for Run 1, 754 Pa-s for Run 2, and 460 Pa-s for Run 3.

While certain representative embodiments and details have been shown for the purpose of illustrating the subject invention, it will be apparent to those skilled in this art that various changes and modifications may be made therein without departing from the scope of the subject invention.

What is claimed is:

1. A method for forming a polyarylene sulfide, the method comprising:
   reacting a sulfur source with a dihaloaromatic compound during a first stage to form an arylene sulfide prepolymer having halogen end groups; and
   thereafter, reacting the arylene sulfide prepolymer with a secondary sulfur source during a second stage to form the polyarylene sulfide, wherein the normalized sulfur ratio is from about 1.0 to about 5.0, wherein the prepolymer is further reacted with a dihaloaromatic compound during the second stage, and wherein the dihaloaromatic compound employed during the second stage is present in an amount of about 1 wt. % or more, based on the weight of the polyarylene sulfide;
   wherein the polyarylene sulfide has a melt viscosity of about 250 poise or more, as determined in accordance with ISO Test No. 11443:2005 at a temperature of 310° C. and shear rate of 1,200 $s^{-1}$.

2. The method of claim 1, wherein the polyarylene sulfide has a weight average molecular weight of about 18,000 Daltons or more.

3. The method of claim 2, wherein the arylene sulfide prepolymer has a weight average molecular weight of from about 3,000 to about 18,000 Daltons.

4. The method of claim 1, wherein the halogen end groups are chlorine end groups.

5. The method of claim 1, wherein the halogen end groups constitute from about 0.5 wt. % to about 8 wt % of the weight of the arylene sulfide prepolymer.

6. The method of claim 1, wherein the secondary sulfur source is employed in an amount of about 1.5 wt. % or more based on the weight of the prepolymer.

7. The method of claim 1, wherein the sulfur source and secondary sulfur source are an alkali metal sulfide, or a derivative, hydrate, or complex thereof.

8. The method of claim 1, wherein the sulfur source includes a SMAB-NaSH complex.

9. The method of claim 8, wherein the secondary sulfur source includes a SMAB-NaSH complex.

10. The method of claim 1, wherein the dihaloaromatic compound is p-dichlorobenzene.

11. The method of claim 1, wherein the molar ratio of the dihaloaromatic compound to the sulfur source is from about 0.5 to about 2.0.

12. The method of claim 1, wherein the reaction in the first stage and second stage occurs in the presence of an organic amide solvent.

13. The method of claim 12, wherein the organic amide solvent is NMP.

14. The method of claim 12, wherein the molar ratio of the sulfur source to the organic amide solvent in the first stage is from about 2.0 to about 4.0.

15. The method of claim 1, wherein the reaction in the first stage occurs at a temperature range of from about 150° C. to about 260° C.

16. The method of claim 1, wherein the reaction in the second stage occurs within a temperature range of from about 200° C. to about 285° C.

17. The method of claim 1, wherein the first stage and the second stage are performed in separate reactors.

18. The method of claim 1, wherein the polyarylene sulfide has a yellowness index of about 10 or less.

19. The method of claim 1, wherein the polyarylene sulfide is a polyphenylene sulfide.

20. The method of claim 1, wherein the polyarylene sulfide has a melt viscosity of about 600 poise or more, as determined in accordance with ISO Test No. 11443:2005 at a temperature of 310° C. and shear rate of 1,200 $s^{-1}$.

* * * * *